Sept. 8, 1936.  C. A. RUESENBERG  2,053,783
PUMP
Filed June 15, 1931
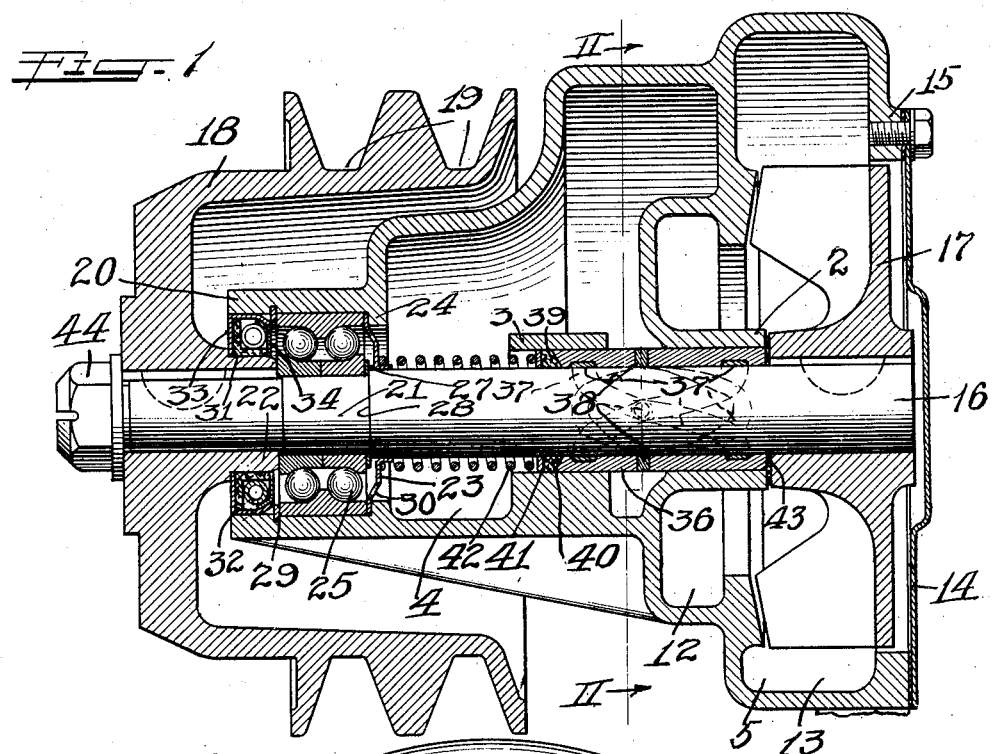

Patented Sept. 8, 1936

2,053,783

UNITED STATES PATENT OFFICE 2,053,783

PUMP

Carl A. Ruesenberg, Rockford, Ill., assignor, by mesne assignments, to Borg-Warner Corporation, Chicago, Ill., a corporation of Illinois Application June 15, 1931, Serial No. 544,307

4 Claims. (Cl. 308—36.2)

This invention has to do with pumps, applicable to a wide variety of uses, and herein shown for illustrative purposes only as applied to the cooling system of an internal combustion engine.

It is an important object of this invention to provide an efficient driving mechanism for pumps, embodying means for automatically lubricating the pump shaft.

A further object of the invention embodies the provision of pump structure comprising parts made by simple machine work and casting operations and which may be very readily assembled.

Another object of the invention is to provide a self-lubricating and self-adjusting pump structure. An additional object of the invention is to supply and to control the supply of lubricant to the journalled portions of a pump shaft, in accordance with the lubricant requirements.

In carrying out the invention, I provide a pump casing which, for the purpose of the present illustration, is preferably connected with the water inlet of an engine and to the cold water outlet of the radiator, said casing including an integral housing through which the impeller shaft passes, one end of the shaft carrying an impeller and the other end of the shaft carrying a fan belt pulley or gear. The housing includes a lubricant reservoir and self-adjusting packing means is provided for the shaft. Special bearing instrumentalities are employed for feeding lubricant automatically to the bearing surface of the shaft adjacent the impeller, and the casing adjacent the opposite end of the shaft is mounted on a ball or roller bearing which receives its lubricant from the same reservoir, means being associated with said instrumentalities for sealing said reservoir from the water. A semi-solid lubricant such as grease is preferably employed, and the lubricating instrumentalities preferably embody material through which the lubricant passes by capillary attraction.

Other objects and advantages of the invention will appear more fully from the following description and from the accompanying drawing, in which similar characters of reference indicate similar parts throughout the several views:

Figure 1 is a longitudinal sectional view of a pump constructed in accordance with the present invention, certain parts being shown in elevation.

Figure 2 is a transverse sectional view taken approximately in the plane indicated by the line II—II in Figure 1.

The structure chosen to illustrate the pump constructed in accordance with the principles of the present invention comprises a casing 1 having integral collars 2 and 3 having substantially the same inside diameter. The casing provides a lubricant reservoir 4 and a water circulating chamber 5 of substantially spiral form as is common in centrifugal pumps. The casing 1 has an inlet 6 adapted for connection to the bottom of a radiator to provide for entry of cool water into the pump, and an outlet 7 adapted for connection to the water jacket of an engine, both said inlet and outlet communicating with the chamber 5 as shown. The opening 8 located substantially centrally of the outlet 7 is adapted to receive a pivot bolt, suitable packing being employed of course to prevent leakage, and adjusting slots 9 and 10, concentric with the opening 8, are also provided to adjust the slack in the driving belt, usually from the fan pulley. The boss 11 serves to provide for one limit of adjustment of the pump.

It will be noted that the inlet 6 communicates with the reduced portion 12 of the chamber 5, and the outlet 7 communicates with the enlarged portion 13 of the chamber. A cover 14, accompanied by suitable packing, is bolted to the open end 15 of the casing 1 when the pump is assembled.

A shaft 16 is located centrally of the collars 2 and 3 and extends beyond said collars on one side into the enlargement 13 of the chamber, where an impeller 17 is keyed thereto. The opposite end of the shaft 16 extends on the other side beyond the confines of the casing 1 and has keyed thereto a pulley 18 having one or more belt grooves 19 and adapted to receive power from the fan pulley or otherwise.

The casing 1, adjacent the pulley 18, is provided with a substantially cylindrical boss 20 which surrounds the reduced portion 21 of the shaft 16 and also the reduced portion 22 of the pulley 18. A double ball bearing 25 is disposed between the reduced portion 21 and the boss 20 and serves to take the end thrust in both directions, as well as any radial thrust. An inwardly extending flange 24 at the inner end of the boss 20 provides a shoulder between which and the bearing 25 a dished ring 23 is positioned, said ring including a cylindrical portion which slidably receives the shaft 16 adjacent the reduced portion 21. A washer 27 between the shoulder 28 of the shaft 16 and the inner race of the ball bearing 25 serves to maintain the inner and outer races of the bearing in proper alignment. The bearing is retained in the boss 20 by a split ring or the like 29.

The dished ring 23 is provided with openings 30 to provide access of lubricant to the bearing 25. A packing ring 31 on the reduced portion 22 of the pulley 18 has its cylindrical portion surrounded by a coil spring 32, both of these parts being substantially encased in an annular closure comprising the parts 33 and 34, the action of the spring 32 being such as to prevent escape of lubricant therethrough.

Disposed in the bushing 2, and bridging the gap between the collars 2 and 3 and extending partly through the collars 3, is a bearing sleeve 36 which has embedded therein substantially continuous bearing material 37 comprising a graphite composition by which lubricant is transferred by capillary attraction from the lubricant reservoir 4 to the portion of the pump shaft 16 enclosed by the collars. It will be noted that certain portions 38 of the material 37 are located intermediate the collars 2 and 3 and are at all times in communication with the lubricant in the reservoir 4.

The inner surface 39 of the sleeve 36 is bevelled inwardly and engages a correspondingly bevelled packing ring 40, the opposite side of the ring being engaged by a washer 41. A compressed spring 42 has one end engaging the washer 41 and the other surrounding the cylindrical portion of the dished ring 23 and engaging said ring, constantly urging the washer and ring away from each other. By reason of the bevelled engaging surfaces of the bearing sleeve 36 and the packing ring 40, it will be evident that the pressure of the spring 42 will force the packing ring into sealing relation to the rotating shaft 16. Spring pressure on the opposite side will also be effective, especially by reason of the presence of the coil spring 32, to prevent leakage of oil as described hereinabove. A suitable packing ring 43 is preferably positioned between the impeller 17 on one side and the bushing 2 and bearing sleeve 36 on the other side, and is compressed by the spring 42 to inhibit entry of water to the portion of the shaft 16 disposed within the sleeve 36.

It will be clear from the foregoing that manual adjustment of the pump structure is entirely dispensed with, such adjustment being taken care of automatically. The component parts of the structure are moreover quite simple, and may be made by simple machining operations or by casting. Moreover, any wear in the relatively movable parts is automatically compensated for by the packing ring 40, which is constantly under spring pressure.

While any suitable lubricant may be employed in connection with the pump construction embodying the principles of this invention, a semi-solid lubricant such as grease is preferably employed. With lubricant of this character, it will be appreciated that its rate of flow through the graphite composition material 37, which, as aforesaid, transfers the lubricant by capillary attraction to the bearing surfaces, will obviously increase with the fluidity of the lubricant, and this property of the lubricant will increase with the temperature of the adjacent parts. Inasmuch as a certain amount of heat will be generated by the journaled portion of the shaft 16, it will be clear that this portion will be properly lubricated at all times and that the quantity of lubricant supplied will increase in accordance with the requirements of the shaft. When the engine is not running, the lubricant within the sleeve 36 assumes the semi-solid character of the remainder of the lubricant and thus serves additionally to prevent leakage of lubricant and access of the water to the lubricated surfaces.

Another advantage of the present invention lies in the facility with which the same may be assembled. While various methods of assembly may be employed, the one to be now described will be illustrative at least of the ease with which this may be accomplished. To this end, the washer 27 is placed against the shoulder 28 of the shaft, and then the bearing 25 is positioned adjacent the washer about the reduced portion 21 of the shaft. The dished ring 23 is then positioned as shown, the spring 42 is placed about the cylindrical portion 26 of the ring 23 and about the corresponding portion of the shaft 16, and then the casing 1 is passed from right to left into telescoped relation to the shaft, with the flange 24 abutting the outer portion of the dished ring 23 and the latter in engagement with the bearing 25. The ring 29 is thereupon snapped into place, the packing ring 31 and associated instrumentalities are positioned on the reduced portion 22 of the pulley 18, and the latter is keyed to the reduced end of the shaft 16 with its reduced portion 22 engaging the bearing 25, whereupon the nut 44 is tightened on the threaded end of the shaft 16 to force the pulley 18 into tight engagement with the bearing 25. In order to reduce loss of time in properly centering the shaft 16 in the collars 2 and 3, it would be well to position the washer 41 adjacent the spring 42 when the spring is put in place.

With the parts thus arranged, the shaft 16 is now centered within the collars 2 and 3, and the packing ring 40 is thereupon placed against the washer 41, followed by the sleeve 36. The packing ring 43 is placed adjacent the outer ends of the collar 2 and sleeve 36, after which the impeller 17 is keyed on the outer end of the shaft 16 and at the same time pressed toward the spring 42 until the latter is compressed and the outer ends of the collar 2 and sleeve 36 are substantially flush as shown. The closure 14 is then bolted in position about the open end 15 of the casing 1. This completes the assembly. It will be understood, of course, that prior to or after the placing of the casing 1 about the shaft 16, the reservoir 4 of the casing will have received a supply of semi-solid lubricant. It is thus apparent that the assembly of the pump structure as a whole involves but a matter of a few moments. Once the pump is assembled, it is complete in itself and may be readily connected to the radiator and water jacket respectively of the vehicle.

It will be clear from the foregoing that no complicated parts are required and the parts are very few in number so that the cost of manufacture is extremely low. In addition, the pump requires no adjustment after assembly and is highly efficient in preventing leakage of either the lubricant or the fluid pumped thereby.

Inasmuch as the sleeve 36 serves as a bearing in which the shaft 16 is journalled, obviously the sleeve 36 will be stationary relative to the shaft and may be fixed to the casing 1 by any suitable means as by a press fit. This is mentioned by way of example for the reason that the particular manner of securing the sleeve is not a part of this invention.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In a pump structure, a shaft having spaced power receiving and liquid pumping portions, a casing having a lubricant reservoir about said shaft, bearing means journaling said shaft at the ends of the reservoir, the bearing means at the power receiving portion of the shaft having direct communication with the lubricant, and the bearing means at the pumping portion of the shaft including heat-responsive flow control means affording communication between the reservoir and said pumping portion of the shaft, and means cooperating with said control means to prevent direct access of lubricant to said pumping portion.

2. In a pump structure, a shaft having spaced power receiving and liquid pumping portions, a casing having a lubricant reservoir about said shaft, bearing means journaling said shaft at the ends of the reservoir, the bearing means at the power receiving portion of the shaft having direct communication with the lubricant, and the bearing means at the pumping portion of the shaft including heat-responsive flow control means affording communication between the reservoir and said pumping portion of the shaft, and sealing means for preventing direct access of lubricant to said pumping portion, said sealing means being associated with said pumping portion of the shaft and the bearing means thereat and constructed and arranged to automatically compensate for wear therebetween.

3. In a pump structure, a shaft having spaced power receiving and liquid pumping portions, a casing having a lubricant reservoir about said shaft, bearing means journaling said shaft at the ends of the reservoir, the bearing means at the power receiving portion of the shaft having direct communication with the lubricant, and the bearing means at the pumping portion of the shaft including heat-responsive flow control means affording communication between the reservoir and said pumping portion of the shaft, and means arranged to prevent access of lubricant to said pumping portion other than through said control means.

4. In a pump structure, a shaft having spaced power receiving and liquid pumping portions, a casing having a lubricant reservoir about said shaft, bearing means journaling said shaft at the ends of the reservoir, the bearing means at the power receiving portion of the shaft having direct communication with the lubricant, and the bearing means at the pumping portion of the shaft including heat-responsive flow control means affording communication between the reservoir and said pumping portion of the shaft, and sealing means associated with the bearing means and the pumping portion of the shaft for preventing direct access of lubricant to said pumping portion and constructed and arranged to automatically compensate for wear therebetween, said sealing means affording a support for the intermediate part of the shaft to prevent deflection thereof.

CARL A. RUESENBERG.